United States Patent Office 3,547,848
Patented Dec. 15, 1970

3,547,848
THIXOTROPIC COATING COMPOSITIONS COMPRISING A VARNISH AND A DI-SUBSTITUTED UREA
Frederick S. Marsh, Chicago, Layton F. Kinney, Villa Park, and Roy J. Betty, Jr., Chicago, Ill., assignors, by mesne assignments, to Armour Industrial Chemical Company, a corporation of Delaware
No Drawing. Filed Nov. 3, 1967, Ser. No. 680,335
Int. Cl. C09d 3/64, 5/04
U.S. Cl. 260—22            16 Claims

ABSTRACT OF THE DISCLOSURE

Thixotropic coating compositions comprising a base varnish or paint and urea produced by the in situ reaction of an aliphatic amine and an isocyanate and method of forming such thixotropic compositions. The compositions of this invention provide excellent thixotropic varnishes and paints having superior sprayability and brushability on a number of substrates.

BACKGROUND OF THE INVENTION

The desirability of highly thixotropic coating compositions, particularly varnishes, paints, lacquers and synthetic coatings has long been recognized. Thixotropy is a phenomenon, for which the exact mechanism of functioning has not been satisfactorily explained, resulting in compositions becoming less viscous when subjected to high shear forces and then returning to their normal condition when they are allowed to stand. Such properties are desirable in coating compositions so that they will tend to flow out evenly when brushed or sprayed, but will return quickly to their higher viscosity. These desired characteristics result in ease of brushing, lack of sagging, and elimination of settling and flooding of the pigment, spill resistance of the composition, and low penetration into porous materials to which the coating is applied.

Previous methods for obtaining bodying of paints have been by use of soaps, bodied oils, and very fine or chemically modified pigments. However, these methods do not provide the degree of thixotropy resulting in the desired ease of application. Another generally used method of thickening paint is the inclusion of an amine reacted bentonite clay as a thickening agent.

An improvement in forming thixotropic compositions using mineral particles is described in U.S. Pat. 2,975,071, wherein isocyanates are added to the paint compositions containing siliceous minerals, allegedly linking the mineral particles to film-forming ester-containing materials.

DESCRIPTION OF THE INVENTION

This invention is directed toward thixotropic coating compositions and methods for their preparation which obviate many of the disadvantages experienced with prior art materials and methods. This invention provides thixotropic varnishes, paints, lacquers, and similar coating compositions which may be sprayed with pneumatic equipment and exhibit minimal or no sag when applied to vertical surfaces. The coating compositions are also especially satisfactory when applied by brush, exhibiting excellent brushing properties.

The thixotropic coating compositions of our invention comprise a major proportion of a base coating selected from the group consisting of varnish and paint and a minor proportion of urea produced by the in situ reaction of an aliphatic amine and an isocyanate. The amine terminated structure is preferred.

Aliphatic mono-amines are preferred amine reactants, particularly amines containing an aliphatic group of from about 6 to 22 carbon atoms attached to an amino nitrogen. Such aliphatic groups may be a branched or straight hydrocarbon chain and saturated or unsaturated. Primary mono-amines selected from the group consisting of N-normal-alkyl, N - normal-alkenyl and N - secondary-alkyl amines having from 6 to 22 carbon atoms are preferred. Mixtures of amines can be used.

N-secondary-alkyl amines are especially useful due to their low melting points resulting in long chain primary amines having fluid properties at room temperatures and under field conditions. Such amines may be produced from olefins by the method described in U.S. Pat. 3,338,-967, Aug. 29, 1967. One preferred sub-class is N-secondary-alkyl amines having from about 7 to 18 carbon atoms. The aliphatic group may be a cyclic group or an arylalkyl group such as 9(10)-phenylstearylamine as derived from oleic acid.

Isocyanates suitable for use in this invention include those isocyanates which react with an amine to form a urea. Suitable isocyanates are selected from the group consisting of aromatic and aliphatic mono- and polyisocyanates. Long chain aliphatic polyisocyanates are suitable wherein the aliphatic group contains from about 6 to 22 carbon atoms. It is preferred to use di-functional isocyanates, or prepolymers thereof, including diisocyanate selected from the group of aromatic diisocyanates, such as toluene diisocyanate, and aliphatic diisocyanates such as hexamethylene diisocyanate and the long chain aliphatic diisocyanates such as derived from aminostearylamine and aminomethylstearylamine. Toluene diisocyanate is especially preferred in formulating the compositions of the invention. Commercially available toluene diisocyanates which are mixtures of tolyl 2,4-diisocyanate and tolyl 2,6-diisocyanate are satisfactory. Generally, the tolyl 2,4 isomer is present in greatest abundance.

Suitable compositions according to our invention may be formulated by forming in situ from about 0.05 to 10 weight percent urea based upon the total composition. Preferred compositions contain from about 0.1 to 5 weight percent urea. The optimum concentration of urea will vary depending upon the type of solvent utilized and the particular thickening properties desired. Thixotropic concentrates can be formed which contain up to 20% or more urea in a varnish or paint solvent. Such concentrates can then be added to varnishes and paints to form thixotropic coating compositions. We have found the arylaliphatic primary amines, such as 9,(10)-phenylstearylamine, to be particularly suited to formation of concentrates, especially when the phenylstearylamine is used in combination with an N-sec-alkyl primary amine, such as N-sec-alkyl($C_{11-14}$) primary amine.

Base coatings well known in the art may be rendered thixotropic by this invention. The term coating compositions as used in this specification and claims is meant to include varnishes, paints (including enamel, semi-gloss and flat paints), and lacquers. These compositions may be formulated from natural or synthetic sources. The coating compositions may contain non-reactive fillers, pigments, preservatives, and the like.

The base coatings may contain natural lacquer components such as, for example, linseed oil, tung oil, soybean oil, fish oil, octicica oil, sunflower oil, olive oil, cashew nut oil and the like, as well as non-drying oils such as, for example, castor oil, and the like, natural resins, such as, for example, rosin, shellac, copal and the like, and synthetic resin lacquer components such as synthetic resins, for example, alkyd, vinyl and acrylic resins, urethane oils, and the like. Thus, it is seen that the definition of varnish and paint as used in this specification and claims includes natural and synthetic coatings of a wide variety and including all of the commercially available clear and pigmented coatings.

The solvent component of the base coating is generally a substantial proportion of the composition. Suitable solvents include hydrocarbons, saturated or unsaturated, aromatic or aliphatic, and alcohols, ketones, esters, ethers, and the like, such as mineral spirits, turpentine, xylene, toluene, benzene, ethyl acetate, butyl acetate, amyl acetate, methyl ethyl ketone, methyl-isobutyl ketone, furfuryl alcohol, and the like.

The composition of our invention can be readily produced by the process comprising adding an aliphatic amine and an isocyanate to a base coating selected from the group consisting of varnish and paint to form from 0.05 to 10 weight percent, based upon the total composition, urea in situ, and mixing for a time sufficient to cause the in situ formation of urea. A preferred process is the formation of from 0.1 to 5 weight percent urea in situ. To form theureas it is suitable to use from less than the stoichiometric requirement of amine and isocyanate to about 40 percent excess of amine. It is preferred to add the amine in a mole ratio of amine to isocyanate of from about 1:1 to 2.8:1. It has been found especially satisfactory to use the mole ratio of amine to isocyanate of from 2:1 to 2.8:1. It is also preferred to add the amine to the solvent of a base coating first and then add the isocyanate with stirring.

The urea may be formed in situ in the total base coating composition, or may be formed in a liquid component of the base coating during the formulation of the base coating composition. Also, as described above, the concentrates containing the urea may be formed in situ in a portion of the solvent and then added to the coating composition.

The thixotropic thickening obtained according to our invention is obtained by reaction of the diisocyanate with the amine. 0.7 percent toluene diisocyanate was added to an alkyd base paint of the formulation described in Example VII, and no thixotropy was obtained. 1.3 percent N-sec-alkyl($C_{11-14}$) primary amine was added and the paint showed thickening as exemplified by Table XII.

The compositions of this invention may be formulated in batches by simple mixing in tanks, and stored for use as desired. Such compositions are stable over wide temperature ranges and over long periods of time.

The thixotropic coating composition of this invention may be emulsified for use in aqueous systems using conventional emulsifiers and well known emulsion techniques.

The following examples are presented to illustrate the present invention.

EXAMPLE I

Mineral spirits was thickened by the in situ reaction of N-sec-alkyl primary amines and toluene diisocyanate. The mineral spirits was added to a beaker and an amine was added directly to the mineral spirits after stirring in an amount to produce the concentration noted in Tables I and II following which toluene diisocyanate was added to produce the concentration noted in the tables to produce a mole ratio of 2 moles of amine to 1 mole of toluene diisocyanate. The stirring was continued until maximum thickening was obtained, usually a matter of seconds, but in no case longer than 5 minutes. The appearance of the product is noted in Table I. The appearance of the products was the same after standing for a period of 1 month in a static condition. The viscosities were obtained by measurement with a Brookfield Viscometer at 75° F. and revolutions per minute as noted in Tables I and II following standing under static conditions for 1 hour, 1 week, 2 weeks and 1 month. The results are shown in Tables I and II.

EXAMPLE II

The procedure of Example I was followed using xylene and mole ratios of amine to toluene diisocyanate of 2:1. The viscosity was determined in the same manner as in Example I and results are shown in Tables III and IV.

TABLE I.—BROOKFIELD VISCOSITY IN CENTIPOISES

| Additive*—amine | Percent conc. | Appearance** | Initially R.p.m. | | | | 1 week R.p.m. | | | |
|---|---|---|---|---|---|---|---|---|---|---|
| | | | 2 | 4 | 10 | 20 | 2 | 4 | 10 | 20 |
| Control (no additive) | | F | 20 | 10 | 6.5 | 7 | 25 | 15 | 7.0 | 7.0 |
| N-sec-alkyl($C_{7-9}$) primary amine | .1 | VF | 150 | 100 | 55 | 34 | 150 | 100 | 50 | 32 |
| | .3 | VF | 250 | 150 | 80 | 52 | 200 | 130 | 72.5 | 48 |
| | .5 | SVF | 120 | 100 | 85 | 55 | 120 | 100 | 90 | 60 |
| | 1 | SVF | 110 | 70 | 36 | 23 | 100 | 65 | 30 | 20 |
| | 2 | VF | 700 | 390 | 180 | 104 | 600 | 330 | 165 | 96 |
| | 5 | SFG | Solid Gel | | | | Solid Gel | | | |
| N-sec-alkyl($C_{11-14}$) primary amine | .1 | F | 20 | 15 | 5 | 5 | 20 | 20 | 6 | 6 |
| | .3 | F | 30 | 15 | 5 | 6 | 35 | 10 | 5 | 8 |
| | .5 | SVF | 50 | 25 | 15 | 11 | 50 | 30 | 15 | 12 |
| | 1 | SVF | 20 | 20 | 15 | 7 | 30 | 20 | 10 | 9 |
| | 2 | TVG | 4,500 | 2,200 | 1,250 | 840 | 9,400 | 4,800 | 2,460 | 1,440 |
| | 5 | FSG | Solid Gel | | | | Solid Gel | | | |

* Amine plus toluene diisocyanate (65% tolyl 2,4- and 35% tolyl 2,6-).
** Key:
VF=Viscous Fluid.
SVF=Slightly Viscous Fluid.
SFG=Soft Firm Gel.
F=Fluid.
TVG=Thick Viscous Gel.
FSG=Firm Solid Gel.

TABLE II.—BROOKFIELD VISCOSITY IN CENTIPOISES

| Additive*—amine | Percent conc. | 2 weeks R.p.m. | | | | 1 month R.p.m. | | | |
|---|---|---|---|---|---|---|---|---|---|
| | | 2 | 4 | 10 | 20 | 2 | 4 | 10 | 20 |
| Control (No additive) | | 20 | 10 | 7 | 6 | 20 | 15 | 8 | 5 |
| N-sec-alkyl($C_{7-9}$)-primary amine | .1 | 130 | 90 | 45 | 28 | 150 | 95 | 50 | 30 |
| | .3 | 180 | 120 | 65 | 42 | 175 | 130 | 75 | 50 |
| | .5 | 115 | 100 | 85 | 60 | 120 | 100 | 90 | 65 |
| | 1 | 95 | 60 | 30 | 15 | 100 | 70 | 35 | 20 |
| | 2 | 720 | 390 | 180 | 105 | 760 | 380 | 190 | 100 |
| | 5 | Solid Gel | | | | Solid Gel | | | |
| N-sec-alkyl($C_{11-14}$)-primary amine | .1 | 20 | 15 | 7 | 5 | 20 | 15 | 8 | 4 |
| | .3 | 30 | 15 | 8 | 5 | 30 | 15 | 9 | 4 |
| | .5 | 50 | 35 | 15 | 10 | 50 | 30 | 15 | 7 |
| | 1 | 30 | 20 | 15 | 10 | 35 | 20 | 15 | 10 |
| | 2 | 7,100 | 3,850 | 1,950 | 1,180 | 9,200 | 4,200 | 1,980 | 1,100 |
| | 5 | Solid Gel | | | | Solid Gel | | | |

*Amine plus toluene diisocyanate.

TABLE III.—BROOKFIELD VISCOSITY IN CENTIPOISES

| Additive*—amine | Percent conc. | Appearance** | Initially R.p.m. 2 | 4 | 10 | 20 | 1 week R.p.m. 2 | 4 | 10 | 20 |
|---|---|---|---|---|---|---|---|---|---|---|
| Control (No additive) | | F | 20 | 10 | 6.5 | 5 | 20 | 15 | 7 | 5 |
| N-sec-alkyl($C_{7-9}$)-primary amine | .1 | F | 30 | 15 | 15 | 7 | 25 | 20 | 10 | 9 |
| | .3 | VF | 1,200 | 1,100 | 750 | 480 | 1,300 | 1,150 | 725 | 450 |
| | .5 | VVF | 3,100 | 2,400 | 1,500 | 1,040 | 4,900 | 3,500 | 1,150 | 760 |
| | 1 | HVF | 1,800 | 1,500 | 950 | 680 | 1,100 | 900 | 550 | 400 |
| | 2 | FSG | Solid Gel | | | | Solid Gel | | | |
| | 5 | FSG | Solid Gel | | | | Solid Gel | | | |
| N-sec-alkyl($C_{11-14}$)-primary amine | .1 | F | 40 | 25 | 12.5 | 10 | 20 | 20 | 10 | 10 |
| | .3 | F | 80 | 58 | 32.5 | 20 | 100 | 80 | 40 | 25 |
| | .5 | F | 40 | 25 | 10 | 10 | 50 | 30 | 12.5 | 10.5 |
| | 1 | TVG | 6,600 | 3,850 | 2,000 | 1,280 | 6,400 | 3,800 | 2,100 | 1,340 |
| | 2 | SFG | Solid Gel | | | | Solid Gel | | | |
| | 5 | SFG | Solid Gel | | | | Solid Gel | | | |

*Amine plus toluene diisocyanate.
**Key:
F=Fluid.
VF=Viscous Fluid.
VVF=Very Viscous Fluid.
HVF=Heavy Viscous Fluid.
FSG=Firm Solid Gel.
TVG=Thick Viscous Gel.
SFG=Soft Firm Gel.

TABLE IV.—BROOKFIELD VISCOSITY IN CENTIPOISES

| Additive*—amine | Percent conc. | 2 weeks R.p.m. 2 | 4 | 10 | 20 | 1 month R.p.m. 2 | 4 | 10 | 20 |
|---|---|---|---|---|---|---|---|---|---|
| Control (No additive) | | 20 | 10 | 7.2 | 5 | 20 | 15 | 8 | 4 |
| N-sec-alkyl($C_{7-9}$)-primary amine | .1 | 20 | 12.5 | 10 | 7 | 25 | 13 | 10 | 5 |
| | .3 | 1,000 | 800 | 500 | 320 | 1,120 | 980 | 670 | 360 |
| | .5 | 4,950 | 3,200 | 1,100 | 680 | 4,890 | 3,600 | 1,150 | 690 |
| | 1 | 1,000 | 700 | 400 | 260 | 1,150 | 850 | 410 | 270 |
| | 2 | Solid Gel | | | | Solid Gel | | | |
| | 5 | Solid Gel | | | | Solid Gel | | | |
| N-sec-alkyl($C_{11-14}$)-primary amine | .1 | 35 | 20 | 10 | 10 | 35 | 25 | 15 | 10 |
| | .3 | 100 | 75 | 45 | 20 | 100 | 80 | 50 | 25 |
| | .5 | 50 | 35 | 15 | 10 | 60 | 40 | 20 | 10 |
| | 1 | 5,900 | 3,450 | 1,850 | 1,180 | 6,600 | 3,920 | 1,980 | 1,400 |
| | 2 | Solid Gel | | | | Solid Gel | | | |
| | 5 | Solid Gel | | | | Solid Gel | | | |

*Amine plus toluene diisocyanate.

EXAMPLE III

Thickened mineral spirits compositions were formulated according to the procedure of Example I using toluene diisocyanate and the amines noted in Tables V and VI. Kerosene and water were added to the thickened products in amounts of 10% by weight of the thickened products, and the appearance was as noted in Table V. The viscosity was obtained by measurement with a Brookfield Viscometer and the results are shown in Table VI at the temperatures and rates per minute noted.

EXAMPLE IV

Thickened xylene compositions were formulated and tested in the same manner as described in Example III, the results being shown in Tables VII and VIII.

EXAMPLE V

Mineral spirits was thickened by the in situ reaction of 9(10)-phenylstearylamine and toluene diisocyanate. The method described in Example I was followed using 2 moles of amine per mole of toluene diisocyanate. Thixotropic clear gels were obtained. The viscosity was measured at room temperature 5 minutes after thickening was obtained and the results are shown in Table IX.

TABLE V.—MINERAL SPIRITS

| Additive*—amine | Percent conc. | Dilution with 10% oil | Dilution with 10% water |
|---|---|---|---|
| N-sec-alkyl($C_{7-9}$)-amine [1] | .5 | Liquid | Liquid, 2 layers. |
| | 2 | do | Do. |
| | 10 | Solid gel | Solid gel. |
| N-sec-alkyl($C_{9-10}$)-amine [1] | .5 | Liquid | Liquid, 2 layers. |
| | 2 | Viscous soft gel | Liquid soft gel. |
| | 10 | Hard gel | Hard gel. |
| N-sec-alkyl($C_{11-14}$)-amine [1] | .5 | Remained fluid | Liquid, 2 layers. |
| | 2 | Liquid | Do. |
| | 10 | Solid gel | Solid gel, $H_2O$ susp. |
| N-sec-alkyl($C_{15-20}$)-amine [1] | .5 | Liquid | Liquid, 2 layers. |
| | 2 | do | Do. |
| | 10 | Hard gel | Hard, $H_2O$ susp. |
| N-sec-alkyl($C_{7-9}$)-amine [2] | .5 | Liquid | Liquid, 2 layers. |
| | 2 | Soft gel | Soft gel, $H_2O$ susp. |
| | 10 | Solid gel | Hard gel, $H_2O$ susp. |

TABLE V.—Continued

| Addition*—amine | Percent conc. | Dilution with 10% oil | Dilution with 10% water |
|---|---|---|---|
| N-sec-alkyl($C_{9-10}$)-amine [2] | .5 | Soft gel | Soft gel, 2 layers. |
|  | 2 | do | Do. |
|  | 10 | Hard gel | Hard gel, $H_2O$ susp. |
| N-sec-alkyl($C_{11-14}$)-amine [2] | .5 | Liquid | Liquid, 2 layers. |
|  | 2 | do | Do. |
|  | 10 | Solid gel | Hard gel, $H_2O$ susp. |
| N-sec-alkyl($C_{15-20}$)-amine [2] | .5 | Liquid | Liquid, 2 layers. |
|  | 2 | do | Do. |
|  | 10 | Hard gel | Hard gel, $H_2O$ susp. |

*Amine plus toluene diisocyanate.
[1] Mole ratio of above amine to diisocyanate is 2:1.
[2] Mole ratio of above amine to diisocyanate is 2.4:1.

TABLE VI.—BROOKFIELD VISCOSITY IN CENTIPOISES
[Mineral Spirits]

| Additive*—amine | Percent conc. | Ratio | 0° F. R.p.m. | | | | 75° F. R.p.m. | | | | 212° F. R.p.m. | | | |
|---|---|---|---|---|---|---|---|---|---|---|---|---|---|---|
| | | | 2 | 4 | 10 | 20 | 2 | 4 | 10 | 20 | 2 | 4 | 10 | 20 |
| N-sec-alkyl-($C_{7-9}$) primary amine | .5 | 2:1 | 490 | 315 | 167 | 110 | 930 | 470 | 204 | 128 | 130 | 75 | 35 | 21 |
| | 2 | 2:1 | 1,760 | 1,880 | 1,788 | 1,774 | 165 | 85 | 48 | 33 | 80 | 45 | 24 | 13 |
| | 2 | 2.4:1 | 16,100 | 9,850 | 4,870 | 2,860 | 17,700 | 12,750 | 6,630 | 3,830 | 660 | 310 | 133 | 75 |
| N-sec-alkyl-($C_{9-10}$) primary amine | .5 | 2.4:1 | 1,920 | 1,120 | 540 | 324 | 1,390 | 745 | 342 | 198 | 10 | 10 | 6 | 6 |
| | 2 | 2.4:1 | 2,040 | 1,620 | 1,168 | 934 | 750 | 498 | 237 | 155 | 120 | 85 | 45 | 30 |
| | 2 | 2:1 | 13,300 | 9,350 | 5,790 | 3,870 | 4,020 | 2,020 | 988 | 586 | 350 | 175 | 78 | 49 |
| N-sec-alkyl-($C_{11-14}$) primary amine | .5 | 2:1 | 4,920 | 3,180 | 1,644 | 982 | 5,760 | 3,330 | 1,616 | 916 | 10 | 5 | 3 | 4 |
| | 2 | 2:1 | 14,900 | 9,400 | 5,070 | 3,290 | 12,200 | 7,550 | 3,940 | 2,420 | 100 | 78 | 43 | 28 |
| | .5 | 2.4:1 | 610 | 370 | 191 | 125 | 390 | 235 | 123 | 83 | 5 | 5 | 3 | 3 |
| N-sec.alkyl-($C_{15-20}$) primary amine | .5 | 2:1 | 450 | 250 | 126 | 79 | 15 | 15 | 14 | 14 | 5 | 2.5 | 2 | 3 |
| | 2 | 2:1 | 6,360 | 3,820 | 2,032 | 1,132 | 890 | 570 | 303 | 188 | 280 | 220 | 122 | 74 |
| | .5 | 2.4:1 | 160 | 105 | 58 | 38 | 10 | 15 | 13 | 11 | 10 | 2.5 | 2.5 | 3 |
| | 2 | 2.4:1 | 4,860 | 3,320 | 1,768 | 1,058 | 1,240 | 785 | 401 | 244 | 490 | 365 | 192 | 118 |

* Amine plus toluene diisocyanate.

TABLE VII.—XYLENE

| Additive*—amine | Percent conc. | Dilution with 10% oil | Dilution with 10% water |
|---|---|---|---|
| N-sec-alkyl($C_{7-9}$)amine [1] | .5 | Soft gel | Soft gel. |
|  | 2 | Solid gel | Solid gel, $H_2O$ susp. |
|  | 10 | do | Do. |
| N-sec-alkyl($C_{9-10}$)amine [1] | .5 | Soft gel | Soft gel, 2 layers. |
|  | 2 | do | Do. |
|  | 10 | Hard gel | Hard gel, $H_2O$ susp. |
| N-sec-alkyl($C_{11-14}$)amine [1] | .5 | Liquid | Liquid, 2 layers. |
|  | 2 | Soft gel | Soft gel, $H_2O$ susp. |
|  | 10 | Solid gel | Solid gel, $H_2O$ susp. |
| N-sec-alkyl($C_{15-20}$)amine [1] | .5 | Liquid | Liquid, 2 layers. |
|  | 2 | Soft gel | Soft gel, 2 layers. |
|  | 10 | Hard gel | Hard gel, $H_2O$ susp. |
| N-sec-alkyl($C_{7-9}$)amine [2] | .5 | Soft gel | Soft gel, $H_2O$ susp. |
|  | 2 | do | Do. |
|  | 10 | Hard gel | Hard gel, $H_2O$ susp. |
| N-sec-alkyl($C_{9-10}$)amine [2] | .5 | Soft gel | Soft gel, 2 layers. |
|  | 2 | do | Do. |
|  | 10 | do | Hard gel, $H_2O$ susp. |
| N-sec-alkyl($C_{11-14}$)amine [2] | .5 | Liquid | Liquid, 2 layers. |
|  | 2 | do | Do. |
|  | 10 | Solid gel | Solid gel, $H_2O$ susp. |
| N-sec-alkyl($C_{15-20}$)amine [2] | .5 | Liquid | Liquid, 2 layers. |
|  | 2 | Thick gel | Thick gel, $H_2O$ susp. |
|  | 10 | Hard gel | Hard gel, $H_2O$ susp. |

* Amine plus toluene diisocyanate.
[1] Mole ratio of above amine to diisocyanate is 2:1.
[2] Mole ratio of above amine to diisocyanate is 2.4:1.

TABLE VIII.—BROOKFIELD VISCOSITY IN CENTIPOISES

[Xylene]

| Additive*—amine | Percent conc. | Ratio | 0° F. | | | | 75° F. | | | | 212° F. | | | |
|---|---|---|---|---|---|---|---|---|---|---|---|---|---|---|
| | | | R.p.m. | | | | R.p.m. | | | | R.p.m. | | | |
| | | | 2 | 4 | 10 | 20 | 2 | 4 | 10 | 20 | 2 | 4 | 10 | 20 |
| N-sec-alkyl-(C$_{7-9}$) primary amine | .5 | 2:1 | 8,100 | 4,740 | 2,208 | 1,208 | 8,140 | 4,480 | 2,300 | 1,424 | 5 | 1 | 2 | 2 |
| | .5 | 2.4:1 | 7,040 | 4,120 | 2,012 | 1,134 | 6,360 | 3,480 | 1,616 | 872 | 5 | 10 | 4 | 3 |
| | 2 | 2.4:1 | 65,300 | 33,750 | 15,340 | 9,000 | 53,700 | 31,850 | 13,520 | 6,960 | 50 | 38 | 15 | 10 |
| N-sec-alkyl-(C$_{9-10}$) primary amine | .5 | 2:1 | 6,880 | 4,060 | 1,928 | 1,074 | 4,560 | 2,920 | 1,520 | 884 | 10 | 5 | 2 | 2 |
| | 2 | 2:1 | 56,700 | 30,450 | 13,460 | 7,230 | 47,300 | 25,350 | 11,840 | 6,430 | 10 | 2.5 | 2 | 3 |
| | .5 | 2.4:1 | 7,940 | 4,600 | 2,152 | 1,196 | 6,840 | 4,040 | 1,936 | 1,074 | 5 | 2 | 2 | 1 |
| | 2 | 2.4:1 | 49,600 | 28,100 | 12,540 | 6,840 | 12,500 | 7,900 | 4,255 | 2,610 | 60 | 35 | 18 | 13 |
| N-sec-alkyl-(C$_{11-14}$) primary amine | .5 | 2:1 | 270 | 185 | 119 | 93 | 130 | 100 | 53 | 37 | 5 | 5 | 6 | 4 |
| | 2 | 2:1 | 19,000 | 11,250 | 5,850 | 3,820 | 11,200 | 5,500 | 2,400 | 2,000 | 90 | 65 | 34 | 25 |
| | .5 | 2.4:1 | 1,150 | 705 | 388 | 253 | 510 | 295 | 158 | 91 | 5 | 2.5 | 2 | 2 |
| N-sec-alkyl-(C$_{15-20}$) primary amine | .5 | 2:1 | 320 | 205 | 98 | 60 | 200 | 125 | 68 | 37 | 2 | 3 | 2 | 2 |
| | 2 | 2:1 | 12,500 | 6,700 | 3,900 | 2,600 | 9,460 | 5,920 | 3,060 | 1,900 | 50 | 45 | 32 | 24 |
| | .5 | 2.4:1 | 51 | 7.5 | 7 | 7 | 1 | 5 | 3 | 5 | 1 | 1 | 3 | 3 |
| | 2 | 2.4:1 | 16,000 | 9,100 | 4,690 | 2,950 | 10,900 | 6,800 | 4,000 | 2,510 | 70 | 65 | 40 | 29 |

*Amine plus toluene diisocyanate.

TABLE IX.—BROOKFIELD VISCOSITY IN CENTIPOISES

| | R.p.m. | | | |
|---|---|---|---|---|
| | 2 | 4 | 10 | 20 |
| Percent conc.: | | | | |
| 2 | 4,460 | 2,520 | 1,152 | 674 |
| 4 | 11,140 | 5,970 | 2,668 | 1,410 |
| 10 | | Solid Gel | | |

EXAMPLE VI

Mineral spirits was thickened using a mixture of 9(10)-phenylstearylamine and N - sec - alkyl(C$_{11-14}$) primary amine in the weight ratio of 7 parts phenylstearylamine to 1 part of N-sec-alkyl(C$_{11-14}$) primary amine and 2 parts of toluene diisocyanate. The method described in Example I for preparation of the gel was followed using 20% by weight of the amine-diisocyanate. A pre-gelled composition was formulated in this manner and resulted in a thixotropic gel having viscosities at room temperature as shown in Table X 1 hour following gelling.

TABLE X

Brookfield viscosity in centipoises

Percent conc. _____ 20
R.p.m.s:
2 _____ 21,400
4 _____ 14,800
10 _____ 8,940
20 _____ 6,090

EXAMPLE VII

An alkyd base paint was formulated and the amine-diisocyanate in situ reaction product used to form a thixotropic alkyd paint.

The base paint was formulated by hand mixing the following chemicals to make up the grind portion:

Grams
Titanium dioxide (Ti-Pure R-902) _____ 600
Stir-in talc (Nytal 300) _____ 380
Long oil alkyd (Xac-C 129) _____ 388
   73% soya
   10% phthalic anhydride
   70% N.V.
Lead naphthenate (24% lead) _____ 10
Mineral spirits _____ 78

The grind was blended thoroughly by hand and passed twice through a 3-roll mill set at 0.002 inch. The let down portion was formulated using the following chemicals:

Grams
Long oil alkyd (Xac-C 129) _____ 502
Lead naphthenate (24% lead) _____ 10
Manganese naphthenate (6% manganese) _____ 4
Phenyl mercuric oleate _____ 29.6

The let down was added to the grind and stirred vigorously for one half hour with a propeller-type stirrer.

250 grams of the paint formulated above was mixed with 23.9 grams of a mineral spirit gel obtained by the in situ reaction of 2 moles of N-sec-alkyl(C$_{11-14}$) primary amine per mole of toluene diisocyanate in an amount of 2% by weight, based upon the resulting paint formulation, in mineral spirits. The blend was mixed by hand and then passed through a 3-roll mill set at 0.002 inch. The Brookfield viscosity of the base paint in situ gel system added with the solvent was measured at room temperature shortly after formulation and resulted in the viscosities as shown in Table XI.

TABLE XI

Brookfield viscosity in centipoises

Percent conc. _____ 2
R.p.m.'s:
2 _____ 2,600
4 _____ 1,700
10 _____ 1,100
20 _____ 760

EXAMPLE VIII

The base paint formulated in Example VII was premixed with N-sec-alkyl(C$_{11-14}$) primary amine in a quantity to result in a 2:1 ratio of amine to diisocyanate and 2% by weight of the final paint formulation and passed through a 3-roll mill at 0.002 inch. The mineral spirits was pre-mixed with the toluene diisocyanate and added to the base paint containing the amine and mixed thoroughly. The viscosity of the final product at room temperature was measured at intervals noted in Table XII under static conditions.

TABLE XII

| | R.p.m. | | | |
|---|---|---|---|---|
| | 2 | 4 | 10 | 20 |
| Time intervals: | | | | |
| 1 day | 9,800 | 10,200 | 5,450 | 3,400 |
| 2 days | 12,600 | 7,800 | 4,450 | 2,960 |
| 1 week | 13,400 | 8,200 | 5,300 | 3,240 |

The amine-diisocyanate in situ reaction product thickened alkyd paint formulated in this example exhibited approximately the same hiding power as the base paint. The thickened paint had good flow characteristics and appeared as a thick, viscous paint, exhibiting a 24 hours drying time.

EXAMPLE IX

A thickened paint was formulated using the same procedure as in Example VIII, using N-sec-alkyl($C_{11-14}$) primary amine and toluene diisocyanate at a 2:1 mole ratio in an amount of 1% by weight, based upon the total paint formulation. Viscosities were measured in the same fashion as Example VIII and are shown in Table XIII.

TABLE XIII

|  | R.p.m. | | | |
| --- | --- | --- | --- | --- |
|  | 2 | 4 | 10 | 20 |
| Time intervals: | | | | |
| 1 day | 10,400 | 5,850 | 2,940 | 1,820 |
| 2 days | 13,975 | 7,600 | 3,685 | 2,280 |
| 1 week | 14,600 | 8,000 | 4,100 | 2,510 |

The paint formulated in the above manner exhibited the same hiding power as the base paint and had good flow characteristics. The paint was thoroughly dry within 24 hours.

EXAMPLE X

A thickened paint was formulated using the same procedure as in Example VIII, using N-sec-alkyl($C_{11-14}$) primary amine and toluene diisocyanate at a 2.4:1 mole ratio in an amount of 1% by weight, based upon the total paint formulation. Viscosities were measured in the same fashion as Example VIII and are shown in Table XIV.

TABLE XIV

|  | R.p.m. | | | |
| --- | --- | --- | --- | --- |
|  | 2 | 4 | 10 | 20 |
| Time intervals: | | | | |
| 1 day | 3,700 | 2,400 | 1,400 | 950 |
| 2 days | 10,000 | 5,800 | 3,250 | 2,140 |
| 1 week | 11,000 | 6,600 | 3,700 | 2,440 |

EXAMPLE XI

A thickened paint was formulated using the same procedure as in Example X, using oleylamine and toluene diisocyanate at a 2:1 mole ratio in an amount of 1% by weight, based upon the total paint formulation. Viscosities were measured in the same fashion as Example X and are shown in Table XV.

TABLE XV

| Time interval | 1 day |
| --- | --- |
| R.p.m.'s: | |
| 2 | 11,700 |
| 4 | 7,100 |
| 10 | 3,620 |
| 20 | 2,700 |

EXAMPLE XII

An alkyd base paint formulation was prepared by adding the following ingredients to the grind to make up the following grind portion:

| | Lbs. |
| --- | --- |
| Titanium dioxide (Ti-Pure R-902) | 600 |
| Stir-in talc (Nytal 300) | 380 |
| Long oil alkyd (Xac-C 129) | 970 |
| 73% soya | |
| 10% phthalic anhydride | |
| 70% N.V. | |
| Lead naphthenate (24% lead) | 20 |
| Mineral spirits | 78 |
| Manganese naphthenate (6% manganese) | 4 |
| Phenyl mercuric oleate | 29.6 |
| N-sec-alkyl($C_{11-14}$) primary amine | 14.3 |

The ingredients of the grind portion were pre-mixed and passed twice through a 3-roll mill set at 0.002 inch. The let down portion was pre-mixed by adding 6.5 pounds of toluene diisocyanate to 200 pounds of mineral spirits and added to the grind portion. The entire formulation was stirred for 30 minutes and the following viscosities obtained, as shown in Table XVI.

TABLE XVI

| R.p.m.'s: | |
| --- | --- |
| 2 | 10,500 |
| 4 | 6,000 |
| 10 | 2,930 |
| 20 | 1,800 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerable without departing from the basic principles of the invention.

We claim:

1. A thixotropic base coating composition comprising a major portion of a varnish and about 0.05 to 10 weight percent, based upon the total composition, of di-substituted urea produced by the in situ reaction of an aliphatic hydrocarbon primary mono-amine having about 6 to 22 carbon atoms in an aliphatic group attached to an amino nitrogen, and a diisocyanate selected from the group consisting of aromatic diisocyanates and aliphatic diisocyanates wherein the aliphatic group contains about 6 to 22 carbon atoms; said amine added in the mole ratio of amine to isocyanate of from 2:1 to 2.8:1.

2. The composition of claim 1 wherein said amine is a mono-amine selected from the group consisting of N-normal-alkyl, N-normal-alkenyl and N-secondary-alkyl amines having from 6 to 22 carbon atoms.

3. The composition of claim 1 wherein said amine is a N-secondary-alkyl amine having from about 7 to 18 carbon atoms.

4. The composition of claim 1 wherein said isocyanate is an aromatic diisocyanate.

5. The composition of claim 4 wherein said aromatic diisocyanate is toluene diisocyanate.

6. The composition of claim 1 wherein said urea is present in an amount from about 0.1 to 5 weight percent based upon the total composition.

7. The composition of claim 1 wherein said amine is a mono-amine selected from the group consisting of N-normal-alkyl, N-normal-alkenyl and N-secondary-alkyl amines having from 6 to 22 carbon atoms, said isocyanate is toluene diisocyanate, and said composition contains from about 0.05 to 10 weight percent urea based upon the total composition.

8. The composition of claim 7 wherein said varnish comprises an alkyd resin.

9. The composition of claim 7 comprising a solvent selected from the group consisting of mineral spirits and xylene.

10. The process of forming a thixotropic base coating composition comprising adding to a varnish composition an aliphatic hydrocarbon primary mono-amine having about 6 to 22 carbon atoms in an aliphatic group attached to an amino nitrogen and a diisocyanate selected from the group consisting of aromatic diisocyanates and aliphatic diisocyanates wherein the aliphatic group contains from about 6 to 22 carbon atoms, to form in situ from about 0.05 to 10 weight percent, based upon the total coating composition, di-substituted urea, said amine being added in the mole ratio of amine to diisocyanate of from 2:1 to 2.8:1, and mixing for a time sufficient to form the di-substituted urea.

11. The process of claim 10 wherein the amine is added first, and then the isocyanate is added.

12. The process of claim 10 wherein said amine is a mono-amine selected from the group consisting of N-normal-alkyl, N-normal-alkenyl and N-secondary-alkyl amines having from 6 to 22 carbon atoms and said isocyanate is toluene diisocyanate.

13. The process of claim 12 wherein said urea is formed in an amount from about 0.1 to 5 weight percent based upon the total composition.

14. The composition of claim 10 wherein said varnish comprises an alkyd resin.

15. The process of claim 10 wherein said coating includes a solvent selected from the group consisting of mineral spirits and xylene.

16. The process of claim 10 wherein said amine is added to the grind portion and said isocyanate is added to the let-down portion.

References Cited

UNITED STATES PATENTS

| | | | |
|---|---|---|---|
| 2,698,300 | 12/1954 | Hotten | 260—553 |
| 3,242,210 | 3/1966 | Dreher et al. | 260—553 |
| 2,975,071 | 3/1961 | Ferrigno | 260—22 |
| 3,183,109 | 5/1965 | Neumann et al. | 260—22 |
| 3,345,338 | 10/1967 | Merten et al. | 260—22 |

OTHER REFERENCES

Chemical Abstracts, vol. 63, No. 2, July 19, 1965, p. 1933F.

Chemical Abstracts, vol. 64, No. 13, June 20, 1966, p. 19943D.

Chemical Abstracts, vol. 66, No. 6, Feb. 6, 1967, item 18925C on p. 1841.

Chemical Abstracts, vol. 66, No. 22, May 15, 1967, item 88328J on p. 8286.

DONALD E. CZAJA, Primary Examiner

R. W. GRIFFIN, Assistant Examiner

U.S. Cl. X.R.

106—218, 252, 285; 117—161, 167, 168; 260—29.2, 32.4, 33.6, 40, 75